United States Patent Office 2,834,768
Patented May 13, 1958

2,834,768
CATALYTIC POLYMERIZATION OF ALKENES TO NORMALLY SOLID POLYMERS

Herbert N. Friedlander, Homewood, Ill., assignor to Standard Oil Company, Chicago, Ill., a corporation of Indiana No Drawing. Application August 18, 1955
Serial No. 529,326

13 Claims. (Cl. 260—93.7)

This invention relates to novel catalysts, processes for the preparation of such catalysts and processes for the polymerization of ethylenically unsaturated compounds, particularly hydrocarbons, with said novel catalysts. In a more specific aspect, this invention is concerned with novel catalysts which are suited for the homo- or hetero-polymerization of normally gaseous n-alkenes to produce high molecular weight, normally solid materials, especially resinous, highly crystalline materials.

One object of my invention is to provide new catalysts for the polymerization of olefinic hydrocarbons or other compounds containing aliphatic (ethylenic) unsaturation. Another object is to provide new methods for the preparation of polymerization catalysts. A third object is to provide processes for the homo- or hetero-polymerization of ethylene and propylene to yield resinous polymers, in which processes novel catalysts or combinations of catalysts are used. Yet another object is to provide new processes for the polymerization of ethylene and/or other normally gaseous unbranched alkenes to solid polymers having high molecular weights and high crystallinity. A further object is to provide a process for the production of the so-called "isotaxic" polymers from propylene, 1-butene, styrene and the like (note G. Natta, J. Poly. Sci. 25, pp. 143–154, April 1955).

I have discovered that ethylene and/or propylene can be polymerized at relatively high rates under mild polymerization conditions with certain novel catalysts to yield normally solid polymers. These novel catalysts are prepared by mixing a metal aluminum hydride with a halogen derivative of boron, particularly a trihalide of boron. It appears that under the conditions of polymerization the metal aluminum hydride interacts with the halide of boron to effect at least partial reduction of the latter and/or the formation of various complexes. While the precise nature of the polymerization catalysts is not known to me, I do know that the specified mixtures function, under polymerization conditions, to yield highly active catalysts, effective for the polymerization of ethylenically unsaturated compounds.

While a large variety of metal aluminum hydrides is, in principle, available for use in my invention, to my knowledge only lithium aluminum hydride is now being manufactured and sold on a commercial scale in the United States. The admixture and/or interaction of metal aluminum hydride and said metal salt is preferably effected in a liquid medium, for example, a saturated hydrocarbon such as heptane, isooctane, dodecane, cyclohexane, methylcyclohexane, cyclopentane and the like, or in an aromatic hydrocarbon such as benzene, toluene, ethylbenzene, xylenes, mesitylene, etc. An ether may constitute the liquid medium or may be used in admixture with a hydrocarbon liquid medium. Suitable ethers include diethyl ether, methyl t-butyl ether, tetrahydrofuran, 1,4-dioxane, dioxolanes, etc. The proportion of liquid medium based upon the catalyst components will be selected within the range of about 0.5 to 10 parts by weight per part by weight of said components. The liquid medium can be purified by known methods to remove materials which react with the catalyst components.

The metal aluminum hydrides employed in the practice of this invention have the general formula $M(AlH_4)_n$, wherein M represents a metal and $n$ represents the valence of M. In the general formula M can represent an alkali metal, viz. lithium, sodium, potassium, rubidium, cesium or mixtures thereof; likewise, M can represent an alkaline earth metal, viz. beryllium, magnesium, calcium, strontium, barium or their mixtures with each other or alkali metal aluminum hydride. Other metal aluminum hydrides can also be used, for example, those of zinc, cadmium, tin, silver, titanium, zirconium, thorium, uranium, molybdenum, etc. One or more of the hydrogen atoms in the above general formula can be substituted by an aliphatic radical such as methyl, ethyl, isobutyl, octyl and the like, or by an aromatic radical such as phenyl, tolyl, xylyl and the like.

The halides of boron which I prefer to employ in the preparation of catalysts are the pure or mixed trihalides, for example, $BF_3$, $BCl_3$, $BBr_3$, $BI_3$, $BBr_2I$, $BBrI_2$, their mixtures or the like. While boron subhalides, such as $B_2Cl_4$ may be used in lieu of or in addition to boron trihalides, it should be noted that the preparation of the subhalides is difficult and expensive and that they are unstable. If desired, the boron halide can be generated in situ in the reaction zone by known methods, which are selected with a view to avoiding by-products that may hinder the desired reaction with the metal aluminum hydride and/or the desired polymerization reaction. Thus in some instances benzene diazonium fluoborate may be used in situ to generate boron fluoride for reaction with a metal aluminum hydride to form a suitable polymerization catalyst. Part or all the halogen in the boron halide can be substituted by a halogenoid such as isothiocyanate or isocyanate radicals, for the purposes of my invention.

The preparation of the catalyst can be effected in the presence of various solid materials, such as carbon, silica, alumina, bauxite, fluorided alumina, synthetic or natural aluminosilicates, magnesia, titania, zirconia, powdered aluminum fluoride, sodium fluoride, sodium chloride, cryolite or the like. The added solid materials can comprise from about 10 to 200 weight percent, based on the weight of the materials which are allowed to react to form the polymerization catalysts.

In order to obtain effective polymerization catalysts it is necessary that the atomic ratio of aluminum to boron in the compounds used to prepare the active catalysts should be at least one. Thus, in the preparation of a polymerization catalyst from $LiAlH_4$ and $BF_3$, at least one mole of the former is used per mol of the latter. In the preparation of catalysts from $Ca(AlH_4)_2$ and $BX_3$ the molar ratio of the former to the latter should be at least 0.5. The atomic ratios of aluminum to boron in the compounds used to prepare active polymerization catalysts can range up to 20, although I prefer to use atomic ratios in the range of about 2 to about 5.

The catalytic materials prepared as described above are enormously active catalysts for the polymerization of ethylene, propylene, isobutylene, butenes, butadienes, styrene, or hydrocarbon derivatives containing ethylenic unsaturation, e. g. tetrafluoroethylene. I may use normally gaseous olefin streams that contain normally gaseous paraffinic hydrocarbons and/or more than one olefinic hydrocarbon, e. g. as in petroleum refinery gas streams produced by thermal or catalytic cracking or dehydrogenation, e. g. refinery ethylene fractions, propylene fractions, ethylene-propylene fractions, butylene fractions, etc.

Polymerization of ethylenic compounds such as normally gaseous n-alkenes can be effected at selected temperatures which vary somewhat in accordance with the polymerization activity of the specific monomer, activity of the selected catalyst, and the type of product which is desired. The selected polymerization temperatures generally fall within the range of about −25° C. to about 300° C., more often about 50° C. to 200° C., preferably about 125° C. to about 175° C.

The polymerization is preferably effected in the absence of impurities which react with and consume the catalysts or the components of the catalytic mixture, such impurities being oxygen, carbon dioxide, water, etc.

Polymerization can be effected at atmospheric pressure or even lower pressures, but it is advantageous to use superatmospheric pressure in order to obtain desirable monomer concentrations in contact with the catalyst. Although the polymerization can be effected at pressures up to about 3000 atmospheres or even higher pressures, I prefer to use pressures in the range of about 20 to about 120 atmospheres, more or less.

The weight ratio of catalyst mixture to monomer can generally be varied in the range of about 0.01 to about 10% or more by weight, for example, about 0.1 to about 5 weight percent. In flow systems in which fresh feed is introduced continuously into relatively static catalyst, the instantaneous catalyst concentration, relative to feed, can be very high, e. g. 100 weight percent or even much more.

Polymerization can be effected by contacting the olefin feed stock at the selected temperature and pressure (as a vapor, gas or liquid, as the case may be) with the mixture produced by the interaction of the catalyst components or with individual components of said mixture which exhibit catalytic activity.

Polymerization is preferably performed in the presence of various reaction media which remain liquid under the selected polymerization conditions of temperature and pressure. I prefer to employ relatively inert liquid reaction media such as saturated hydrocarbons, aromatic hydrocarbons, relatively unreactive alkenes (containing a non-terminal double bond) and cycloalkenes, perfluorocarbons, chloro-aromatics; various ethers such as ethyl ether, tetrahydrofuran, 1,4-dioxane, dioxolanes and the like, or mixtures of suitable liquids.

Suitable agitation of the catalyst and monomer(s) is provided to secure effective contacting by means which are well known.

Through the present process, I can convert ethylene to wax-like homopolymers having an approximate specific viscosity ($\times 10^5$) between about 1000 and 10,000 and tough, resinous ethylene homopolymers having an approximate specific viscosity ($\times 10^5$) of 10,000 to more than 300,000. Propylene may be polymerized by the present process to normally solid materials which soften at temperatures well above room temperature, for example, at least about 75° C. or even much higher temperatures. The polymeric products produced by the processes encompased within the scope of my invention can be subjected to a variety of treatments designed to remove all or part of the catalytic materials therefrom. Thus the polymers can be washed with methanol, alcoholic alkalies or acids or the like in order to remove inorganic contaminants.

The polymer products can be dissolved in hot solvents, for example in aromatic hydrocarbons such as xylenes, and the resultant solutions can be treated to separate polymer having a relatively low content of material derived from the catalyst components. Thus hot aromatic hydrocarbon solutions of polymer can be subjected to the action of various hydrolytic agents to precipitate metal hydroxides which can then be separated from the remaining solution by centrifuging, decantation, filtration or other means. Alternatively, the hot aromatic hydrocarbon solution of polymer can be cooled or treated with precipitants or antisolvents such as acetone, methanol or the like to precipitate a small proportion, say up to about 5 weight percent of the solute polymer, which precipitate contains a very large proportion of the inorganic materials which were originally present in the polymer. The aromatic solvent can be recovered from the aforementioned operations and can be reused.

When very high yields of solid ethylene polymers or other solid polymers, based on the weight of catalyst, are obtained according to this invention, for example yields of at least 100 or 200 grams of solid polymer per gram of catalyst, it may not be necessary for industrial purposes to remove catalyst from the polymer since its concentration by weight therein will be 1 weight percent or even less. It will be appreciated that such a low ash content in solid polymers is, for the most uses of the polymers, an insignificant quantity which will not affect their utility or processing characteristics. The polymers of the present invention can be used or treated as the polymers whose preparation is described in U. S. P. 2,691,647 of Edmund Field and Morris Feller, granted October 12, 1954. Stabilizers which have been found effective in preventing hydrogen chloride evolution from chlororubber, chlorinated waxes and chlorovinyl polymers may be added to the products of this invention which may contain residual halide catalyst component.

The following examples are intended to illustrate our invention but not necessarily to delimit its scope, which is broad.

*Example 1*

A stainless steel stirring reactor of 100 ml. capacity (Magne-Dash) was charged with 50 cc. of dry heptane, 1.9 g. (50 mmol.) of $LiAlH_4$ and the reactor was then sealed and flushed with hydrogen. Then 2 g. (29 mmol.) of $BF_3$ gas were admitted to the reactor, ethylene was compressed into the reactor and the contents were heated with stirring to 126° C. Ethylene polymerization was evidenced by decreasing pressure in the reactor. The reaction pressure was maintained at about 1075 p. s. i. by the introduction of further quantities of ethylene. After 2 hours the stirrer was jammed with polymer. Reaction conditions were maintained for an additional 4 hours and the reactor was then cooled to room temperature, gases were vented and the reactor was opened. The contents of the reactor were agitated with water and hot xylene, the water layer was separated and the xylene solution was filtered hot. The xylene solution was then cooled to room temperature and acetone was added as a precipitant, which effected the separation of 0.82 g. of tough, solid polyethylene from the solution. The specific viscosity $\times 10^5$ of the polymer was 68,000. The residual xylene-acetone solution was evaporated to leave 0.21 g. of grease-like polyethylenes as residue.

A variation of the above example was attempted in which 10.5 mmol. of $LiAlH_4$ and 22.1 mmol. of $BF_3$ were used in ethylene polymerization for 6 hours at 100° C. in a Magne-Dash reactor. This operation yielded only a trace of solid polymer and 1.42 g. of grease-like polyethylenes, illustrating the importance of providing an atomic ratio of aluminum to boron of at least one in the compounds which are used to prepare the catalyst.

*Example 2*

The startup procedure of Example 1 was used but the Magne-Dash reactor was charged with 50 mmol. of $LiAlH_4$ and 8.5 mmol. of $BCl_3$. After one hour and 35 minutes at 125° C. and 1100 p. s. i. of ethylene, the stirrer became jammed with solid polymers of ethylene. Reaction was continued without stirring under these conditions for an equal period of time and the products were worked up as in Example 1 to yield tough, solid polyethylenes and grease-like polymers of ethylene.

*Example 3*

The process of Example 1 is repeated but $Ca(AlH_4)_2$ in the amount of 25 mmol. is substituted for $LiAlH_4$ and the solid polymer of ethylene is worked up as before.

An attempt was made to polymerize ethylene with diborane. A 100 ml. Magne-Dash reactor was charged with 50 ml. of dried heptane and 14.4 mmol. of $B_2H_6$. Ethylene was pressured into the reactor at 1100 p. s. i. at 128° C. and maintained under these conditions for 9 hours. The products were worked up as in Example 1, but only a trace of solid polymer could be isolated and only 0.35 g. of a mixture of grease-like polyethylenes and boric acid.

An attempt was also made to polymerize ethylene to produce tough, solid polymers by contact with $B_2H_6$, LiF and $AlF_3$. A 100 ml. Magne-Dash reactor was charged with 0.65 g. of finely divided, dried LiF, 2.1 g. of $AlF_3$ and 0.3 g. of $B_2H_6$, together with 50 ml. of dried heptane. Ethylene was pressured into the reactor to 1100 p. s. i. and the temperature of the contents was raised to 125° C. Reaction was continued for 11 hours. The products were worked up as in Example 1 but it was possible to isolate only 0.02 g. of dry, solid polymer and 0.10 g. of grease-like polyethylenes.

A mixture of 0.5 g. of diborane and 2.6 g. of $BF_3$ were heated with 16 g. ethylene and 130 ml. heptane in a 300 ml. rocking bomb at temperatures ranging from 25 to 130° C. and pressures of 400 to 940 p. s. i. g. over a period of 8 hours in an attempt to obtain polymerization. It was found, however, that no ethylene polymerization could be obtained with the stated catalysts under the specified conditions.

*Example 4*

The process of Example 1 is repeated but the reactor is charged with propylene in an amount sufficient to produce a pressure of about 1100 p. s. i. in lieu of the ethylene of Example 1. The solid polymers from propylene are isolated as in Example 1.

*Example 5*

The process of Example 1 is repeated but the reactor is charged with 1-butene in an amount sufficient to produce a pressure of about 1100 p. s. i. in lieu of the ethylene of Example 1. The solid polymers from 1-butene are isolated as in Example 1.

Having thus described my invention, what I claim is:

1. A process for the production of a normally solid polymer from a normally gaseous unbranched alkene, which process comprises contacting said alkene under polymerization conditions with a catalyst prepared by mixing a metal aluminum hydride with a boron halide in a proportion sufficient to provide an atomic Al:B ratio of at least one, and recovering a normally solid polymer thus produced.

2. The process of claim 1 wherein said alkene is ethylene.

3. The process of claim 1 wherein said alkene is propylene.

4. The process for the production of a normally solid polymer, which comprises contacting ethylene under polymerization conditions with a catalyst prepared by mixing at least an equimolar amount of an alkali metal aluminum hydride with a boron halide, and recovering a normally solid polymer thus produced.

5. The process of claim 4 wherein said hydride is lithium aluminum hydride.

6. The process of claim 4 wherein said boron halide is boron trifluoride.

7. The process of claim 4 wherein said halide is boron trichloride.

8. A process for the production of a normally solid polymer from ethylene, which comprises contacting ethylene under polymerization conditions including a temperature between about 50° C. about 200° C. under superatmospheric pressure with a catalyst prepared by mixing at least an equimolar amount of an alkali metal aluminum hydride with a boron halide, and recovering a normally solid polymer thus produced.

9. The process of claim 8 wherein said contacting is effected in the presence of a substantially inert liquid reaction medium.

10. The process of claim 9 wherein said hydride is lithium aluminum hydride and said boron halide is boron trifluoride.

11. The process of claim 8 wherein said hydride is lithium aluminum hydride and said halide is boron trichloride.

12. A process for the production of a normally solid polymer from propylene which comprises contacting propylene under polymerization conditions including a temperature between about 50° C. and about 200° C. under superatmospheric pressure with a catalyst prepared by mixing at least an equimolar amount of an alkali metal aluminum hydride with a boron halide, and recovering a normally solid polymer thus produced.

13. A process for the production of a normally solid polymer from ethylene, which process comprises contacting ethylene under polymerization conditions including a temperature between about 50° C. and about 200° C. under superatmospheric pressure with a catalyst prepared by mixing at least an equimolar amount of lithium aluminum hydride with boron trifluoride, the proportion of catalyst mixture to ethylene being at least 0.01% by weight, and recovering a normally solid polymer thus produced.

References Cited in the file of this patent

UNITED STATES PATENTS

| | | |
|---|---|---|
| 1,811,130 | Hofmann et al. | June 23, 1931 |
| 2,624,726 | Serniuk | Jan. 6, 1953 |

FOREIGN PATENTS

| | | |
|---|---|---|
| 315,356 | Great Britain | July 3, 1930 |